United States Patent
Sathyanarayana

(10) Patent No.: US 7,254,282 B2
(45) Date of Patent: Aug. 7, 2007

(54) SYSTEMS AND METHODS FOR TRANSFORMING VIDEO IMAGES USING FAST VISUAL INTERPOLATION

(75) Inventor: Shashidhar Sathyanarayana, Union City, CA (US)

(73) Assignee: SciMed Life Systems, Inc., Maple Grove, MN (US)

( * ) Notice: Subject to any disclaimer, the term of this patent is extended or adjusted under 35 U.S.C. 154(b) by 772 days.

(21) Appl. No.: 10/352,382

(22) Filed: Jan. 27, 2003

(65) Prior Publication Data

US 2004/0146219 A1 Jul. 29, 2004

(51) Int. Cl.
*G06K 9/32* (2006.01)
*G06K 9/00* (2006.01)

(52) U.S. Cl. .................................. 382/300
(58) Field of Classification Search .......... 382/300, 382/167, 278; 345/660
See application file for complete search history.

(56) References Cited

U.S. PATENT DOCUMENTS

| | | | |
|---|---|---|---|
| 4,725,892 A | 2/1988 | Suzuki et al. | |
| 4,872,054 A | 10/1989 | Gray et al. | 358/140 |
| 5,313,275 A | 5/1994 | Daly et al. | 348/592 |
| 5,757,355 A * | 5/1998 | Ogura et al. | 345/660 |
| 5,774,601 A | 6/1998 | Mahmoodi | |
| 5,993,463 A * | 11/1999 | Truwit | 606/130 |
| 6,026,179 A | 2/2000 | Brett | 382/162 |
| 6,249,603 B1 | 6/2001 | Rucklidge | 382/169 |
| 6,373,980 B2 * | 4/2002 | Ohta | 382/167 |
| 2001/0046319 A1* | 11/2001 | Ohta | 382/167 |
| 2002/0048412 A1* | 4/2002 | Wredenhagen et al. | 382/278 |
| 2004/0146219 A1* | 7/2004 | Sathyanarayana | 382/300 |

FOREIGN PATENT DOCUMENTS

EP 0700015 A1 6/1996

* cited by examiner

*Primary Examiner*—Amir Alavi
(74) *Attorney, Agent, or Firm*—Orrick Herrington & Sutcliffe LLP

(57) ABSTRACT

In an image gathering and display system, data is interpolated by gathering non-interpolated input data and formatting that data such that a user of the data can interpolate the data without requiring the image gathering and display system to perform the interpolation. A series of weighted randomly selected non-interpolated input data values are displayed to the user as a stream of non-interpolated output values, such that the user interpolates the series of non-interpolated output values.

14 Claims, 5 Drawing Sheets

FIG. 3A
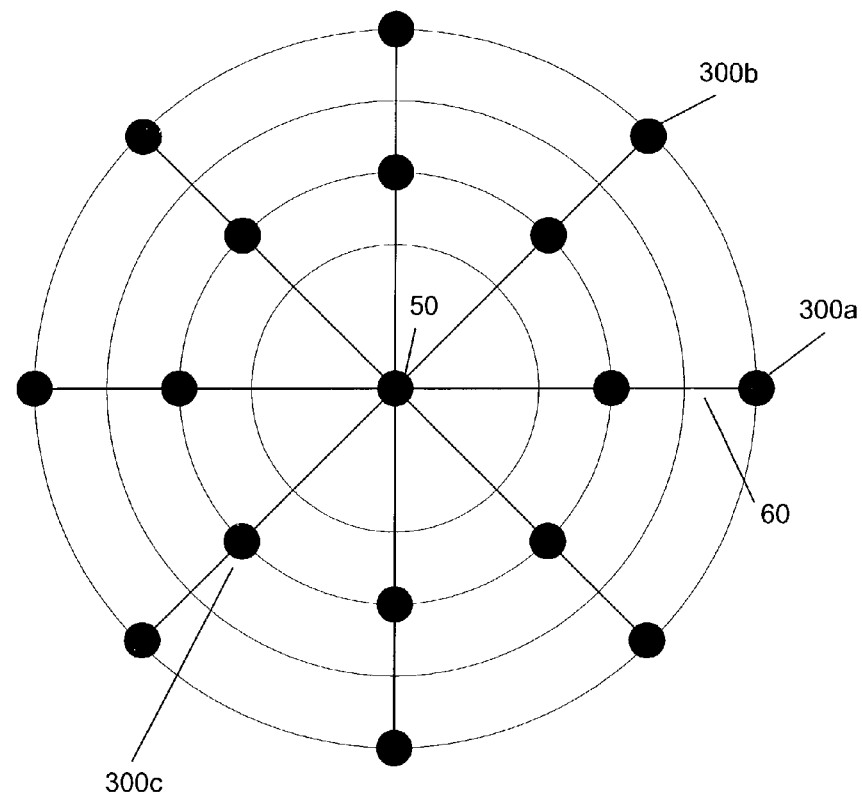
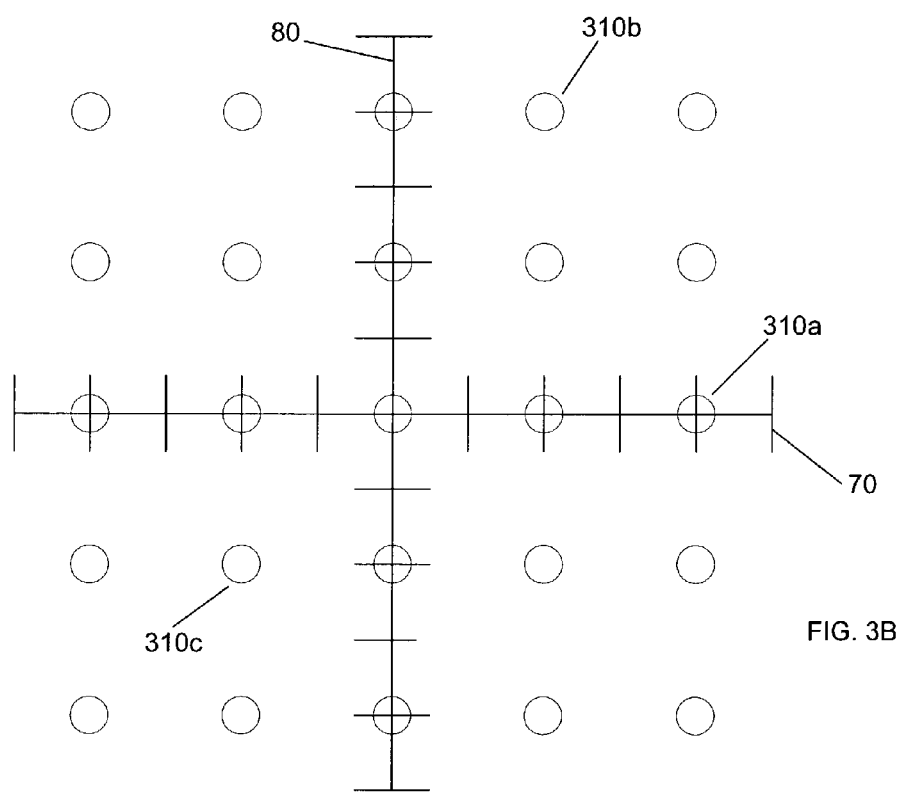
FIG. 3B

SYSTEMS AND METHODS FOR TRANSFORMING VIDEO IMAGES USING FAST VISUAL INTERPOLATION

FIELD OF THE INVENTION

The field of the invention relates to a data presentation system and method, and more particularly to a system and method for rapidly presenting to a user data to be interpolated by the user.

BACKGROUND

In many imaging devices, the process of building up an image involves a conversion of acquired/pre-processed data, for example conversion from one co-ordinate system to another. For example, an imaging system may collect data in polar co-ordinates and display the data in Cartesian co-ordinates. It is often the case that, on applying the prescribed point-to-point transformation necessary to do this conversion, assigning a value to a desired pixel location in the final co-ordinate system calls for retrieving data from a non-existent location in the original co-ordinate system. This non-existent location is called the ideal location. For example, due to factors such as the resolution of the imaging scanner or other data gathering device, the resolution of the display device, or the difference in resolutions between these two devices, the display device may wish to display a pixel of video information for a location on the display device (e.g. video monitor), where there is no corresponding pixel of video information gathered by the imaging scanner. The value of this pixel must therefore be determined by alternate methods.

A simple method of assigning a value to the desired pixel location is by allowing it to take on the value of the original data point positioned closest to the desired ideal location. More accurate methods compute the value to be assigned to the desired pixel location by forming a weighted-average of several values obtained in the neighborhood of the ideal location. Factors used to determine which neighborhood values to use, and the weight assigned to each neighborhood value, include: proximity to the ideal location as well as characteristics of the neighborhood value itself such as it's brightness, hue, color, etc. In general, for a given transformation, the weights and the neighborhood associated with each desired pixel location being filled are pre-computed and stored as a look-up table.

The process of building up the final image calls for filling each pixel location by (1) retrieving from the look-up table the weights and neighborhood associated with the pixel location, (2) retrieving the data from the identified neighborhood, (3) computing the desired pixel value by forming the weighted-average, and 4) using the computed pixel value to display a pixel of video information that represents the weighted average.

Owing to the considerable number of data-retrieval and arithmetic operations needed to fill each pixel in the final image, this method is often implemented using dedicated hardware to perform the arithmetic operations and other operation necessary to ensure that the final image is rapidly composed and presented in its entirety. This becomes important if the images form part of a video sequence, whose satisfactory viewing calls for maintaining a minimum frame rate. Although the transformation can be accomplished using software, in applications where the processor has a limited amount of time between frames, using dedicated hardware remains the preferred method. Dedicated hardware, however, is costly and takes up additional space within the imaging system. There is therefore a need for systems and methods of processing and interpolating video and other types of data more rapidly than conventional software solutions, without incurring the additional expense and space requirements of a dedicated hardware solution.

SUMMARY OF THE INVENTION

In an example embodiment, non-interpolated data values are presented to an output data point in series. In another example embodiment, a plurality of non-interpolated input data values are associated with one output data point, which plurality of non-interpolated input data values, if desired, may be provided to the output data point as a series of non-interpolated input data values. In still another example embodiment, each member of the series of non-interpolated input data values is determined by randomly selecting one of the plurality of non-interpolated input data values based on an associated weight, which measures the relative contribution of the non-interpolated input data value to an interpolated output data value. In another yet example embodiment, the series of non-interpolated input data values is rapidly presented to a user, and interpolated by the user. In another example embodiment, a series of non-interpolated pixels of video information is created by randomly selecting non-interpolated pixels based on their associated weight, and the series is displayed such that a human viewer's visual system is capable of interpolating the series of non-interpolated pixels of video information.

BRIEF DESCRIPTION OF THE DRAWINGS

In order to better appreciate how the above-recited and other advantages and objects of the inventions are obtained, a more particular description of the inventions briefly described above will be rendered by reference to examples of specific embodiments, which are illustrated in the accompanying drawings, in which like reference numerals refer to like parts. The components in the figures are not necessarily to scale, emphasis instead being placed upon illustrating the principles of the invention. Moreover, all illustrations are intended to convey concepts, where relative sizes, shapes and other detailed attributes may be illustrated schematically rather than literally or precisely. Understanding that these drawings depict only example embodiments of the invention and are not therefore to be considered limiting of its scope, the invention will be described and explained with additional specificity and detail through the use of the accompanying drawings in which:

FIG. 3A is an example input image expressed in polar coordinates.

FIG. 3B is an example output image expressed in Cartesian coordinates.

DETAILED DESCRIPTION OF THE PREFERRED EMBODIMENTS

The embodiments disclosed below are in the context of displaying video information. However, those skilled in the art will appreciate that the concepts disclosed apply in other contexts as well, and thus the scope of the invention is not to be limited by the embodiments disclosed herein. For example, instead of video data, audio data, thermal data, or any other type of data that may be interpolated could be used. Similarly, the video output display could be replaced by an audio output such as a speaker, a thermal output such as a heat conductive material, or any other type of output device capable of outputting data to be interpolated.

Figure 1:
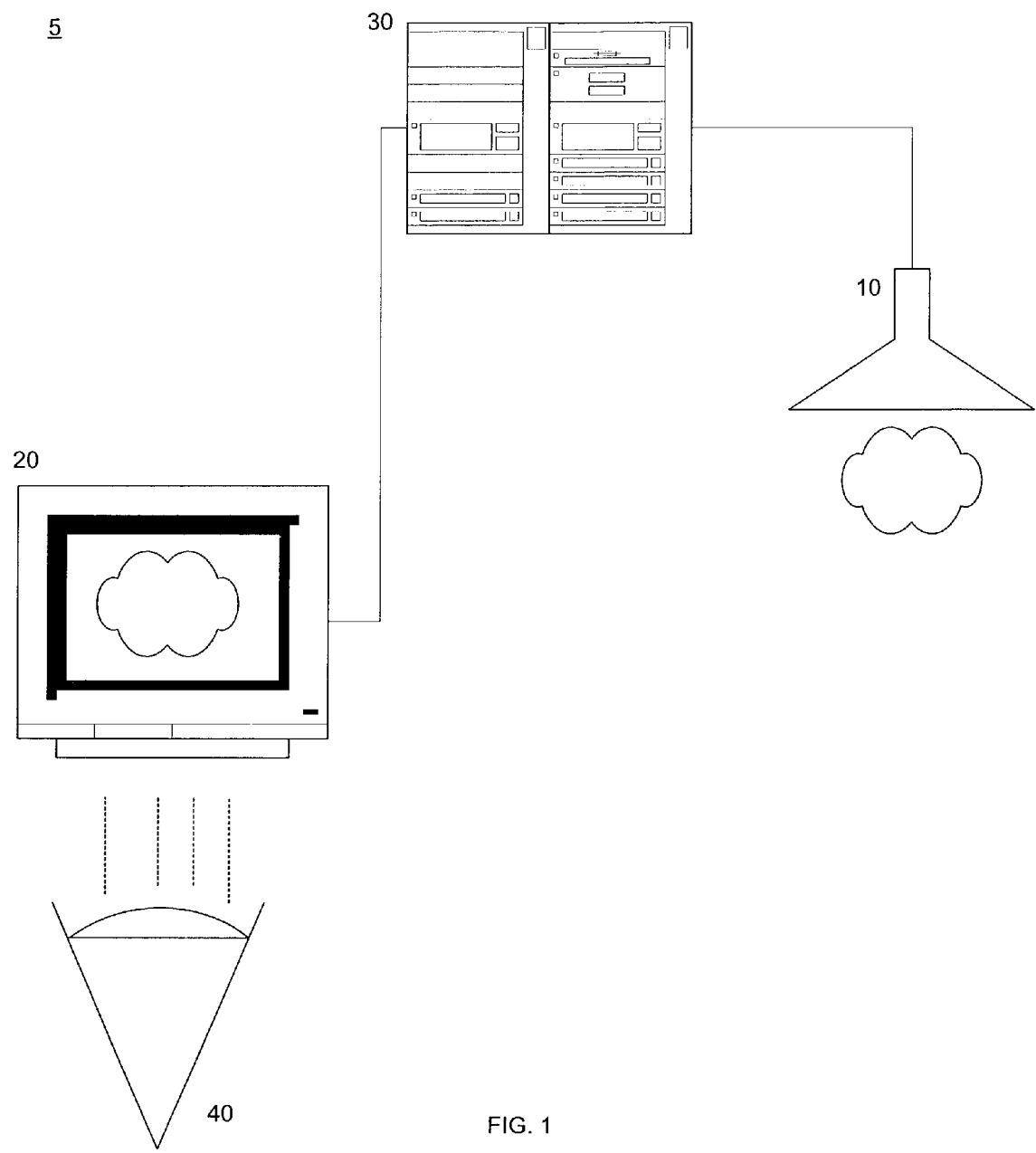
FIG. 1 is an example embodiment of an improved imaging system.

Turning to FIG. 1, an example embodiment of an improved video imaging system 5 includes an input scanner 10, a data processor 20 and a video display 30. The input scanner 10 can be any of a wide variety of devices adapted to receive input signals in a variety of forms. For example, the input scanner 10 could be a medical scanner such as an x-ray machine, a magnetic resonance imaging (MRI) system, a light-based imaging device such as optical coherence tomography (OCT) and optical coherence domain reflectometry (OCDR) devices, or other devices. Alternatively, the input scanner 10 could be an ultrasound imaging device, microphone or other device that receives audio signals. Alternatively the input scanner 10 could be a video camera or other device that receives visual light signals. In alternate embodiments that operate on pre-generated input data, the input scanner 10 is optionally not present.

The input data received by the input scanner 10 has certain characteristics. For example, the data may be expressed in terms of a particular co-ordinate system, such as polar co-ordinates or Cartesian co-ordinates. Additionally, the input data may have been sampled at a particular resolution, for example 600 dots-per-inch (DPI) for visual input data, where each dot represents a discrete unit of input data, or 44.1 kHz for audio input data, which collects a sound sample value 44,100 times in one second.

The input data received by the input scanner 10 is then routed to an output device 20, such as a video display terminal, a computer monitor, a television, a video game console monitor, an audio speaker, or any other such output device. The output device 20 may be adapted to receive data in a different format than that generated by the input scanner 10. For example, the input scanner 10 may receive audio data, and the output device 20 may display video data. Alternatively, the input scanner 10 may receive video data expressed in polar co-ordinates, such as a medical scanner adapted to capture a series of views of a patient as the scanner rotates around the patient, and the output device 20 may be adapted to display video data expressed in Cartesian coordinates, such as a standard video display terminal which displays a Cartesian array of pixels expressed in an (x, y) format, where (0,0) represents one corner of the display terminal. Alternatively, the input scanner 10 may receive video data at a resolution of 600 DPI, and the output device 20 may display video data at a resolution of 1200 DPI.

To convert the input data into a format useful to the output device 20, the input data is routed to the output device 20 via a processor 30, such as a personal computer, a workstation, a mainframe, or a dedicated image processor. The processor 30 is adapted to convert the input data into a format useful to the output device 20. For example, the processor 30 converts audio input data into video output data, if it desired to display the audio input signal as a video output signal. Alternatively, the processor 30 converts polar co-ordinate input data into Cartesian coordinate output data. Alternatively, the processor 30 converts 600 DPI video input data into 1200 DPI video output data.

Once processed by the processor 30, the input data is routed to the output device 20, where it is presented for display to a user 40. In an embodiment, the output device 20 is a video display terminal, and the user 40 is the eye of a human being. Alternatively, the user 40 can be a machine vision sensor, a camera, or in embodiments where the output device 20 outputs other forms of data such as audio or thermal data, the user 40 could be a human ear, or a human hand or other such thermally sensitive organ, or a microphone or other such electronic or mechanical device.

As discussed above, when performing these or other conversions, the processor 30 frequently encounters situations where the calculation of an item of output data requires one or more items of input data that are not present in the input data received from the input scanner 10. For example, assume the input scanner 10 receives input data at 600 DPI, and the output device 20 outputs data at 1200 DPI. This means that for a given display area on the output device 20, there will be four times as many pixels of display information to fill with output pixel values as there are input pixels of video data containing input pixel values.

Figure 2A:
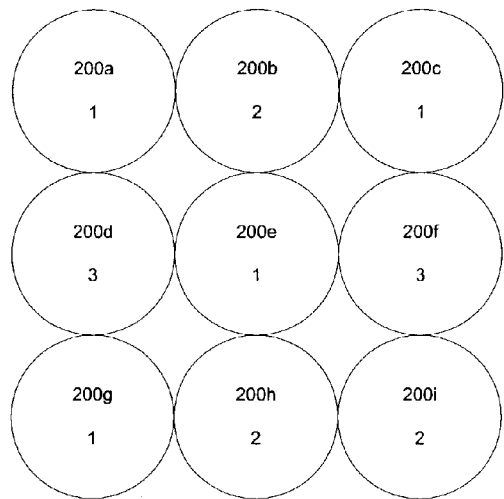
FIG. 2A is a 600 dots per inch (DPI) resolution input image according to an example embodiment of the improved imaging system.
Figure 2B:
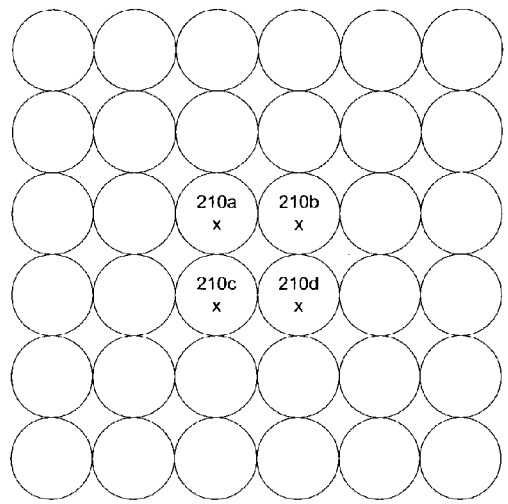
FIG. 2B is a 1200 DPI resolution output image according to an example embodiment of the improved imaging system.
Figure 2C:
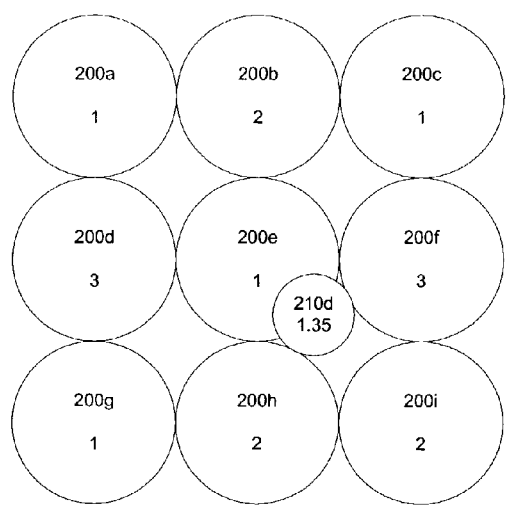
FIG. 2C is a composite image with a selected element of the output image superimposed over the input image.

A close-up of a portion of the input data gathered at 600 DPI and the corresponding portion of the output data displayed at 1200 DPI is shown in FIGS. 2A-2C. FIG. 2A shows input pixels $200a$-$i$ of input data at 600 DPI. Each input pixel $200a$-$i$ has an input pixel value, which may represent a color, an intensity, a hue, or other similar values, or combinations of these values. For clarity, these values are represented as single integers, though they may also be other types of data, such as arrays of numbers or other such data types.

FIG. 2B shows output pixels 210 of output data at 1200 DPI, including output pixels $210a$-$d$. Each output pixel 210 has an output pixel value, which is similar to the input pixel values in scope.

FIG. 2C shows output pixel $210d$ of output data superimposed on the input pixels 200 of input data, to highlight the relationship between the input pixels 200 and the output pixel $210d$. As can be seen in FIG. 2C, the output pixel $210d$ does not correspond to any of the input pixels 200. To accurately compute the output pixel value of the output pixel $210d$ shown in FIG. 2C according to conventional methods, as discussed above, a weighted average of the values of the input pixels 200 in the neighborhood of the output pixel $210d$ is computed, and this value is assigned as the interpolated value of the output pixel $210d$.

For example, it may be determined that an acceptably accurate interpolation of the value of the output pixel $210d$ may be computed by given a weight of 75% to input pixel $200e$ (since it is the closest pixel to pixel $210d$), a weight of 10% to input pixels $200f$ and $200h$ (since they share a much smaller border with pixel $210d$), and a weight of 5% to input pixel $200i$ (since it shares the smallest border with pixel $210d$). The other input pixels 210 do not border pixel $210d$, so they do not contribute any weight to the value of pixel $210d$. Therefore, the value of pixel $210d$, interpolated according to conventional methods, is:

$$(0.75\times1)+(0.10\times3)+(0.10\times2)+(0.05\times2)=0.75+0.30+0.20+0.10=1.35.$$

The value of each other output pixel 210 is computed in similar fashion, using weights and neighborhoods selected to generate acceptably accurate images.

Figure 3C:
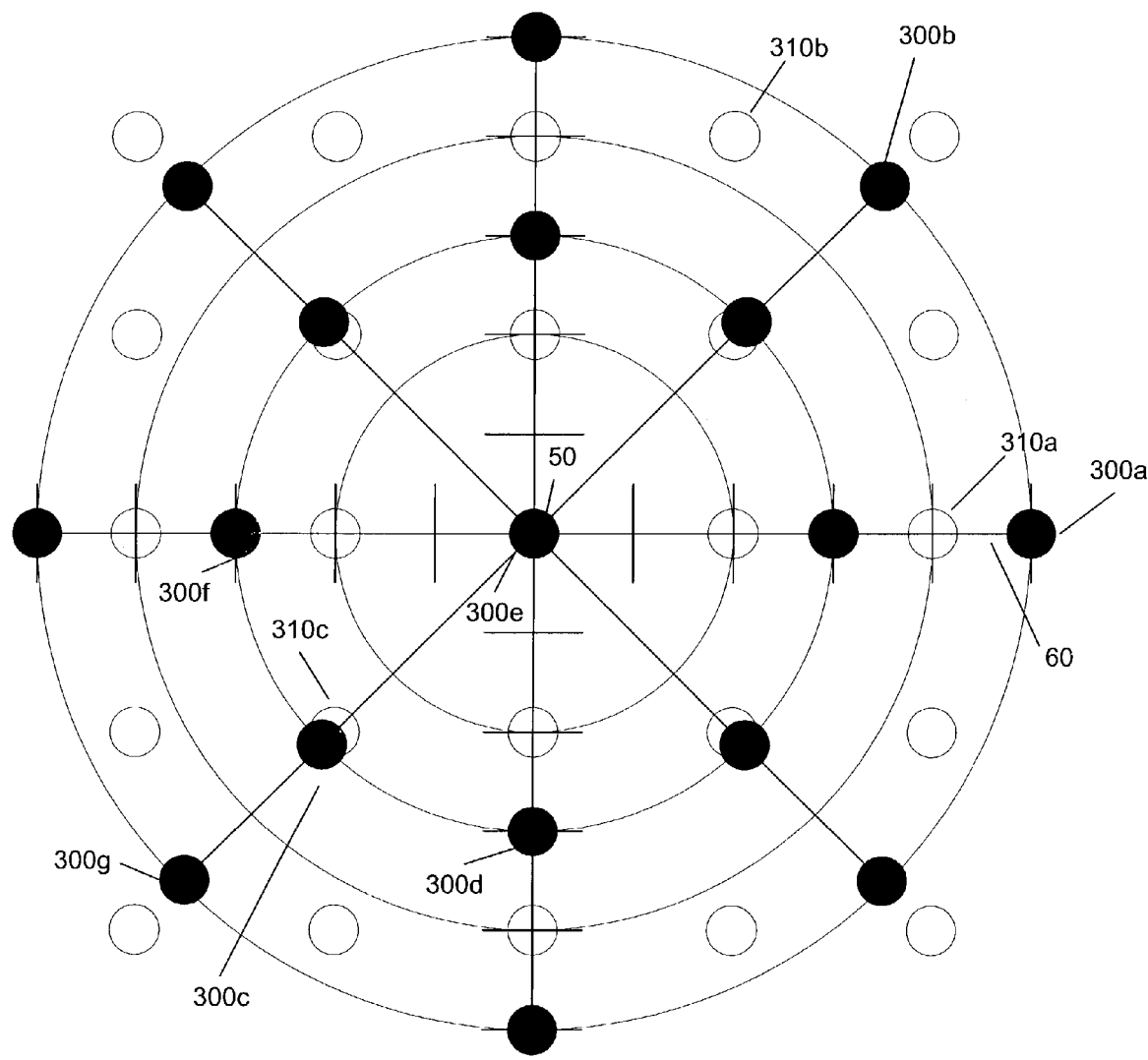
FIG. 3C is the input image of FIG. 3A superimposed on the output image of FIG. 3B.

As a second example, turning to FIGS. 3A-C, if the input scanner 10 receives input data expressed in one coordinate system, such as sensor data from a medical scanning device which uses polar coordinates, and the output device 20 displays output data expressed in a second coordinate system, such as video display data formatted for display on a standard video display monitor which uses Cartesian coordinates, there are cases where an output pixel on the video display monitor does not have a corresponding input data point in the input data received from the medical scanning device. FIG. 3A depicts the input data gathered by the medical scanning device, represented in polar coordinates. The polar coordinate system is represented as a pair of numeric values (r, θ), where r is the radius out from a fixed origin point 50, and θ is the distance in radians from a fixed origin line 60. Input pixels 300 are located at various coordinates in the polar coordinate system. For example, input pixel 300a is located at (2.5, 0). Input pixel 300b is located at (2.5, π/4). Input pixel 300c is located at (1.5, 5π/4). The other input pixels 300 are arrayed similarly around the polar coordinate system of FIG. 3A.

FIG. 3B depicts the array of output pixels 310, expressed in Cartesian coordinates, that the video display monitor is capable of generating. The Cartesian coordinate system is represented as a pair of numeric values (x, y), where x is the distance from the fixed origin point 50 along the x-axis 70, and y is the distance from the fixed origin point 50 along the y-axis 80. For example, output pixel 310a is located at (2, 0). Output pixel 310b is located at (1,2). Output pixel 310c is located at (−1, −1). The other output pixels 310 are arrayed similarly across the Cartesian coordinate system of FIG. 3B.

FIG. 3C depicts the polar coordinate input data superimposed on the Cartesian coordinate array of output pixels from the video display monitor. As can been seen in FIG. 3C, there are some pixels in the polar coordinate system whose Cartesian counterparts do not exist on the Cartesian grid of the output system. In this example, none of the input pixels 300a-d nor 300f-g correspond to valid Cartesian grid points, as shown by the lack of complete overlap between the input pixels 300a-d and 300f-g and any of the output pixels 310. Pixel 300e does correspond to a valid Cartesian grid point, as shown by the complete overlap between pixel 300e and the Cartesian grid point (0,0). Thus, for example, the values of the output pixels 310a-c each are interpolated from the neighboring input pixels 300, using a weighting of the input pixels, as discussed above. The value of output pixel 310c, for example, is computed by taking the weighted average of input pixels 300c-g. An example weighting formula is:

output value=75%(300c)+10%(300d)+3%(300e)+10%(300f)+2%(300g)

so assuming values for the input pixels 300c-g as follows: 300c=1, 300d=2, 300e=1, 300f=4, 300g=2, then the output value would be:

(0.75×1)+(0.10×2)+(0.03×1)+(0.10×4)+(0.02×2)=1.42.

As discussed above, one way to assign a value to an output pixel using these weighted averages is by using look-up tables. For example, for each output pixel, a look-up table is created which lists all of the output pixel's neighbors, and the weighted contribution each neighbor makes to the output pixel. When the output is rendered, the processor interpolates each output pixel by referencing the look-up table and computing the weighted-average value of the output pixel using the weighted contributions of each neighbor, as discussed above. With reference to output pixel 310c of FIG. 3C, the look-up table for this pixel is shown in Table 1:

TABLE 1

| Output Pixel | Neighbor 1 | Neighbor 2 | Neighbor 3 | Neighbor 4 | Neighbor 5 |
|---|---|---|---|---|---|
| 310c | 300c 75% | 300d 10% | 300e 3% | 300f 10% | 300g 2% |

The processor 30 builds this look-up table for each pixel to be displayed, such as each pixel in the frame of video that is next up to be displayed on the output device 20. When the frame is displayed on the display device 20, the processor 30 parses the look-up tables, identifies each output pixel 310, retrieves the values from each of the specified neighbor input pixels 300, computes the weighted contribution to the value of the output pixel 310 using the weights specified in the look-up table, and then outputs the output pixel 310 using the computed weighted average value. When the output data is full-motion video, all those computations have to be made for every frame of video. This process is very computationally expensive, and results in either a slow video image, or a requirement for expensive hardware to do the process rapidly.

Instead of relying on the processor 30 which is part of the imaging system 5 to do the interpolation, the improved imaging system and method formats the data in such a manner that permits the user 40 viewing the video display terminal to do the desired interpolation processing. For example, if the user 40 viewing the video display terminal is a human being, then the human brain can be relied upon to do the necessary interpolation of the input data pixel 300 values to generate a weighted-average interpolation of the input data pixels 300, as further described below. Thus the circuitry of the image display system can be simplified, and/or the video display rate can be maintained or increased.

In order for the user 40 to properly interpolate the input data pixel 300 values that contribute to the desired output data pixel 310 value, the input data pixel 300 values are displayed via the output device 20 to the user 40, in uninterpolated form, in a time-separated sequence. As each unit of time passes, a different one of the neighbor input data pixels is displayed on the output data pixel. The specific neighbor input data pixel is selected based on the weight assigned to that pixel, using the weight allocations outlined above. For example, referring to the output pixel 310c of FIG. 3C, the neighbor input pixel 300c is displayed 75% of the time, the neighbor input pixel 300d is displayed 10% of the time, the neighbor input pixel 300e is displayed 3% of the time, the neighbor input pixel 300f is displayed 10% of the time, and the neighbor input pixel 300g is displayed 2% of the time.

Over time, the user 40 perceives each input pixel 300c-g for a different aggregate amount of time, based on the weightings given to the input pixel 300c-g, and the user 40 combines the input pixels together using the weighted average to generate an interpolated output pixel which is perceived by the viewer. For example, where the user 40 is a human being, the user 40 uses the interpolation capacity in the human visual system to automatically interpolate the input pixels 300c-g displayed over time in order to perceive the interpolated output pixel 310c. Artificial users 40, such as machine vision systems, cameras, and similar such devices, perform similar interpolations to perceive the interpolated output pixel 310c from the series of un-interpolated input pixels 300c-g displayed on the output device 20.

One example of an embodiment of a method for determining which neighbor input pixel 300c-g to display on the output pixel 310c is described with reference to the flowchart of FIG. 4. At step 410, for a given output pixel, each neighbor input pixel is identified, and a weight is assigned to each neighbor input pixel. At step 420, an output pixel value is constructed by randomly selecting a single input neighbor pixel, based on the weight assigned to that pixel. For example, a random selection causes the neighbor input pixel 300c to be selected 75% of the time, since it has a weight of 75%. At step 430, the randomly selected neighbor input pixel is added to the composite look-up table. At step 440, a check is made to see if the composite look-up table is full. If the composite look-up table is full, then the method terminates, otherwise control returns to step 420 where another neighbor input pixel is randomly selected.

The method of FIG. 4, operating on the look-up table of Table 1 (which in this example was generated in step 410 of the method), results in the composite lookup table of Table 2 below, where the composite lookup table was chosen to be of size 20. Note that this size is a design choice for those skilled in the art, is not critical to the invention, and may be changed as desired.

TABLE 2

| 1. 300c | 2. 300g | 3. 300c | 4. 300c | 5. 300c |
| 6. 300d | 7. 300c | 8. 300c | 9. 300c | 10. 300d |
| 11. 300f | 12. 300c | 13. 300c | 14. 300e | 15. 300c |
| 16. 300c | 17. 300c | 18. 300f | 19. 300c | 20. 300c |

Figure 4:
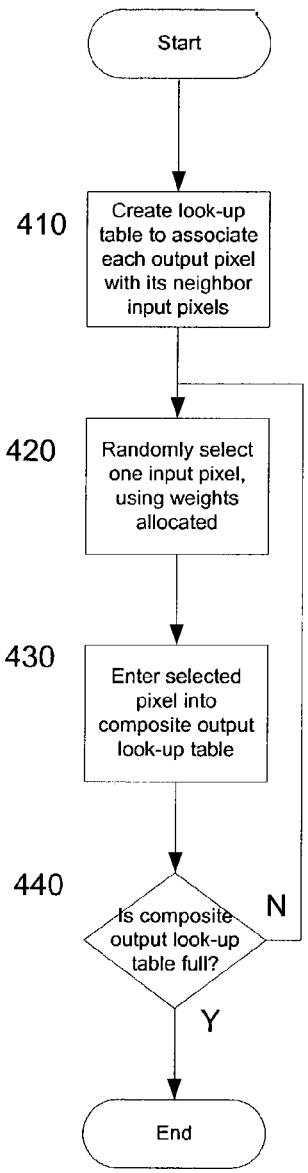
FIG. 4 is a flowchart of an example embodiment of an improved method for preparing input data for interpolation.

Each output pixel in the output device 20 has an associated composite lookup table created for it via the method of FIG. 4. Once all of the composite lookup tables have been created, then the video sequence is output via the output device 20 according to the example method illustrated in FIG. 5. At step 510, the video display sequence is initialized, and a pointer is set to the first cell in each composite lookup table. At step 520, a check is made to see if the video display sequence is complete. If it is, then the method terminates, otherwise control proceeds to step 530, where the next frame of video is output, using the value of the neighbor input pixel specified in the composite lookup tables associated with each output pixel. At step 540, the pointers are incremented to point to the next cell in the composite lookup tables, looping back to the first cell once the final cell in the tables is reached. Control then passes back to step 520, where another check is made to see if the video display sequence is complete.

Figure 5:
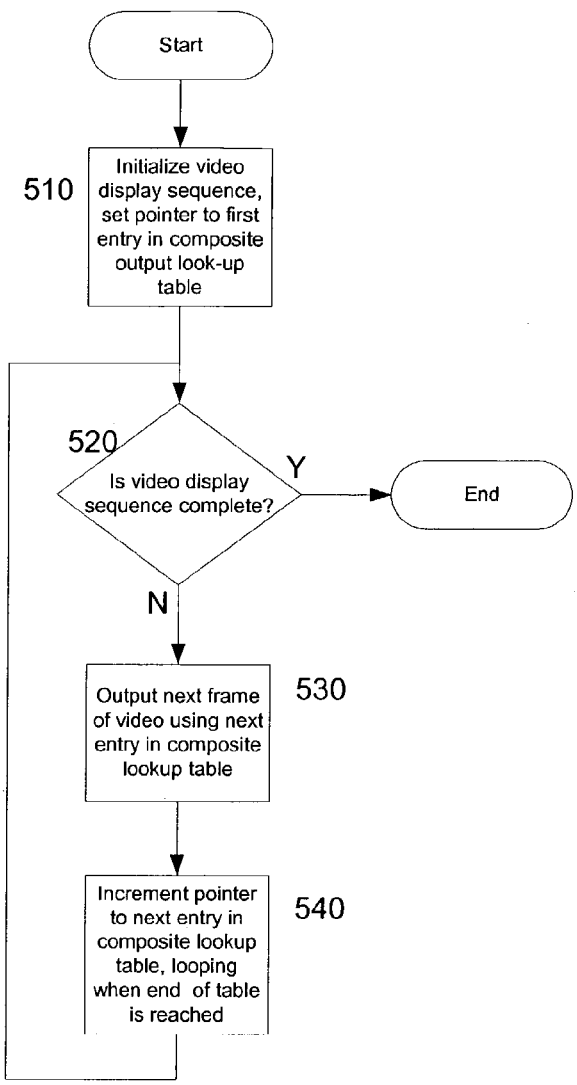
FIG. 5 is a flowchart of an example embodiment of an improved method for displaying input data prepared for interpolation.

The method of FIG. 5 causes each output pixel to display the value associated with one of its neighbor input pixels, in sequence, based on the values stored in the composite lookup table. Since the composite lookup table was populated according to the weight each neighbor input pixel contributes to the output pixel value, this causes the average output pixel value, over time, to be the interpolated output pixel value, without requiring this interpolated output pixel value to be calculated by the imaging system 5. Since the user 40, for example a human eye, is capable of interpolating a sequence of different values, such as brightness or color values, presented to it over time into one weighted-average value, this results in the correct interpolation of an output value from a plurality of neighbor input values, without requiring interpolation by the imaging system 5. To further optimize the process, a composite lookup table containing the next input neighbor pixel in the array for each output pixel can be constructed and processed when the next frame of video is ready for display.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein is merely illustrative, and the invention can be performed using different or additional process actions, or a different combination or ordering of process actions. Additionally, the reader is to understand that the systems and methods disclosed above are not limited to video data, but may be used with any form of data for which interpolation is useful. The specification and drawings are, accordingly, to be regarded in an illustrative rather than restrictive sense, and the invention is not to be restricted or limited except in accordance with the following claims and their legal equivalents.

I claim:

1. A system for displaying data comprising:
an input adapted to receive non-interpolated input data,
a processor adapted to convert the non-interpolated input data into output data adapted for interpolation by a user, wherein the non-interpolated input data is expressed in polar coordinates and the output data is expressed in Cartesian coordinates,
a display device adapted to display the output data adapted for interpolation by a user, such that the user can then interpolate the output data to perceive interpolated output data without the system interpolating the output data.

2. The system of claim 1, wherein the output data comprises video data.

3. The system of claim 1, wherein the input data comprises video data.

4. The system of claim 1, wherein the processor is adapted to convert the input data by identifying a plurality of neighbor input data associated with an output data, and assigns a weight to each of the plurality of neighbor input data based on an attribute of the association with the output data.

5. The system of claim 4, wherein the processor is further adapted to convert the input data by creating a composite lookup table associated with the output data, the composite lookup table containing a plurality of randomly selected neighbor input data.

6. The system of claim 5, wherein the plurality of input data in the composite table are randomly selected based on the weights assigned to the input data.

7. The system of claim 6, wherein the processor is adapted to output the output data by sequentially outputting the plurality of randomly selected neighbor input data in the composite table.

8. The system of claim 4, wherein the attribute comprises a physical distance from the neighbor input data to the output data.

9. The system of claim 4, wherein the attribute comprises the amount of overlap of the neighbor input data and the output data.

10. The system of claim 1, further comprising a rotating scanner adapted to generate the non-interpolated input data in polar coordinates.

11. The system of claim 10, wherein the scanner comprises an ultrasound scanner.

12. The system of claim 10, wherein the scanner comprises an optical coherence tomography scanner.

13. The system of claim 1, further comprising a composite lookup table, wherein the composite lookup table comprises a plurality of neighbor input data associated with an output pixel of the display device, and the processor is adapted to sequentially output the plurality of neighbor input data in the composite table to the output pixel of the display device.

14. The system of claim 13, wherein the plurality of neighbor input data are located in a randomly selected order in the composite lookup table based on weights assigned to the input data.

* * * * *